(12) United States Patent
Kikuzuki

(10) Patent No.: US 9,241,296 B2
(45) Date of Patent: Jan. 19, 2016

(54) RADIO COMMUNICATION TERMINAL, RADIO COMMUNICATION SYSTEM, AND RADIO COMMUNICATION METHOD

(71) Applicant: FUJITSU LIMITED, Kawasaki-shi, Kanagawa (JP)

(72) Inventor: Tatsuya Kikuzuki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 153 days.

(21) Appl. No.: 13/685,409

(22) Filed: Nov. 26, 2012

(65) Prior Publication Data

US 2013/0142092 A1    Jun. 6, 2013

(30) Foreign Application Priority Data

Dec. 6, 2011  (JP) .................................. 2011-267272

(51) Int. Cl.
*H04W 40/34* (2009.01)
*H04W 40/24* (2009.01)

(52) U.S. Cl.
CPC ............ *H04W 40/34* (2013.01); *H04W 40/248* (2013.01)

(58) Field of Classification Search
CPC ..... H04W 40/00; H04W 40/34; H04W 40/12; H04W 40/248
USPC .......................................... 370/238; 455/445
See application file for complete search history.

(56) References Cited

U.S. PATENT DOCUMENTS

| | | | |
|---|---|---|---|
| 2003/0091001 A1* | 5/2003 | Watanabe | 370/236 |
| 2005/0085231 A1* | 4/2005 | Dillinger et al. | 455/445 |
| 2005/0197127 A1* | 9/2005 | Nakasaku et al. | 455/445 |
| 2008/0095058 A1 | 4/2008 | Dalmases et al. | |
| 2009/0016239 A1* | 1/2009 | Honjo | 370/253 |
| 2009/0047898 A1 | 2/2009 | Imamura et al. | |
| 2010/0165846 A1 | 7/2010 | Yamaguchi et al. | |
| 2011/0019540 A1* | 1/2011 | Isozu | 370/227 |

FOREIGN PATENT DOCUMENTS

| | | |
|---|---|---|
| JP | 2006-157117 A | 6/2006 |
| JP | 2008-506292 A | 2/2008 |
| JP | 2008-278148 A | 11/2008 |
| JP | 2010-124294 A | 6/2010 |
| WO | WO 2006-104105 A1 | 10/2006 |
| WO | WO 2008/035600 A1 | 3/2008 |

OTHER PUBLICATIONS

Japanese Office Action mailed Apr. 28, 2015 for corresponding Japanese Patent Application No. 2011-267272.

* cited by examiner

*Primary Examiner* — Paul H Masur
*Assistant Examiner* — Kabir Jahangir
(74) *Attorney, Agent, or Firm* — Arent Fox LLP

(57) ABSTRACT

A radio communication terminal includes an acquisition unit configured to acquire property information indicating a property that is used when a data communication route, on which data communication is performed with other radio communication terminals, is determined, a calculator configured to calculate variation of the property by using the acquired property information, and a controller configured to change a determination reference for whether to change the data communication route in response to the calculated variation of the property.

6 Claims, 8 Drawing Sheets

RADIO COMMUNICATION TERMINAL, RADIO COMMUNICATION SYSTEM, AND RADIO COMMUNICATION METHOD

CROSS-REFERENCE TO RELATED APPLICATION

This application is based upon and claims the benefit of priority of the prior Japanese Patent Application No. 2011-267272, filed on Dec. 6, 2011, the entire contents of which are incorporated herein by reference.

FIELD

The embodiments discussed herein are related to a radio communication terminal, a radio communication system, and a radio communication method.

BACKGROUND

As forms of a network in which a base station and a radio communication terminal are connected with each other or radio communication terminals are connected with each other, there have been a form of connection with a single radio line (link) and a form of connection via a plurality of radio lines in related art. Communication by the form of connection with a single radio line (link) is referred to as single-hop communication or one-hop communication because the number of radio lines (the number of hops) through which data travels until the data reaches a destination is one. On the other hand, communication by the form of connection via a plurality of radio lines is referred to as multi-hop communication because a plurality of hops are used among terminals. Of the single-hop communication and the multi-hop communication, the multi-hop communication is employed in ad-hoc network which enables direct communication among radio communication terminals via no base station or no access point. In the ad-hoc network, other radio communication terminals having a relaying function are interposed between a terminal of a data transmission source and a terminal of a data transmission destination and data is relayed on a plurality of radio lines so as to expand a communication area. Accordingly, extensive radio network can be established.

In the multi-hop communication such as the above-mentioned adhoc network, a plurality of routes coexist in transmission/reception of data such as a packet. Accordingly, when a communication state of a route is deteriorated due to some kind of causes, the route can be changed into a new route of which the communication state is better than the prior route. However, a radio communication terminal which is a transmission source of a packet has to regularly transmit/receive a plurality of packets including detailed link information to and from other terminals in the same network, so as to select a route optimum for the radio communication terminal. There has been such problem that throughput in the network is degraded due to this packet communication. Such problem becomes noticeable when route change is frequently performed due to movement of a terminal or change of a communication environment and the communication amount of packets for a route change procedure is consequently increased.

Japanese Laid-open Patent Publication No. 2008-278148, International Publication Pamphlet No. WO 2008/035600, and Japanese Laid-open Patent Publication No. 2006-157117 are examples of related art.

SUMMARY

According to an aspect of the invention, a radio communication terminal includes, an acquisition unit configured to acquire property information indicating a property that is used when a data communication route, on which data communication is performed with other radio communication terminals, is determined; a calculator configured to calculate variation of the property by using the acquired property information; and a controller configured to change a determination reference for whether to change the data communication route in response to the calculated variation of the property.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

An embodiment of a radio communication terminal, a radio communication system, and a radio communication method according to the present disclosure is described below in detail with reference to the accompanying drawings. Here, the radio communication terminal, the radio communication system, and the radio communication method according to the present disclosure are not limited by the following embodiment.

Figure 1:
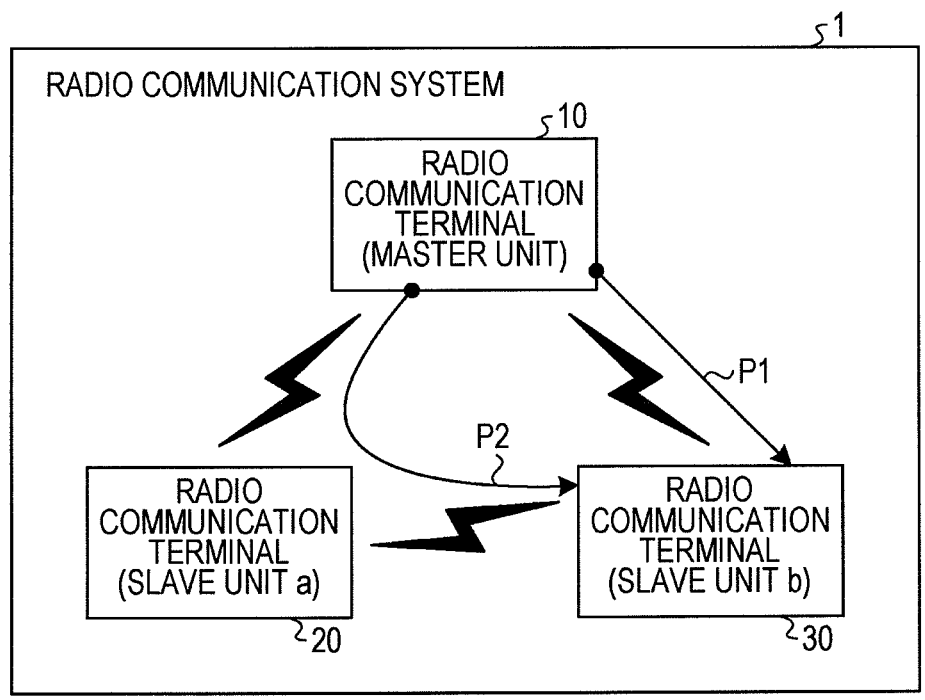
FIG. 1 illustrates the configuration of a radio communication system according to an embodiment.

FIG. 1 illustrates the configuration of a radio communication system 1 according to the present embodiment. As depicted in FIG. 1, the radio communication system 1 includes three radio communication terminals 10, 20, and 30. The radio communication terminals 10, 20, and 30 are respectively connected bi-directionally and directly so as to be able to transmit/receive various signals and data via radio channels, thus forming an ad-hoc network. The radio channel follows standards of a body area network (BAN), for example, but may follow other communication standards such as Bluetooth® and ZigBee®. The radio communication terminals 10, 20, and 30 are disposed on a human body of a trial subject with a spacing of several dozen centimeters to several meters (for example, approximately 50 cm).

It is optimum that the radio communication terminal 10 uses a communication route P1 when transmitting a packet to the radio communication terminal 30 from a viewpoint of shortening of a transmission distance. However, given a received signal strength indication and a moving speed as well, the communication route P1 might not be the optimum route when link quality between the radio communication terminals 10 and 30 is poor. Therefore, the radio communication terminal 10 instructs the radio communication terminal 20 to relay a packet to the radio communication terminal 30 and the radio communication terminal 20 transfers the packet received from the radio communication terminal 10 to the radio communication terminal 30. Accordingly, a transmission route of the packet is changed from the route P1 to a route P2 in FIG. 1. Then, the packet avoids a link having an inferior communication state and reaches a transmission destination through a radio channel in a good communication state. As a result, throughput of packet communication is enhanced. Further, power consumption is reduced.

Figure 2:
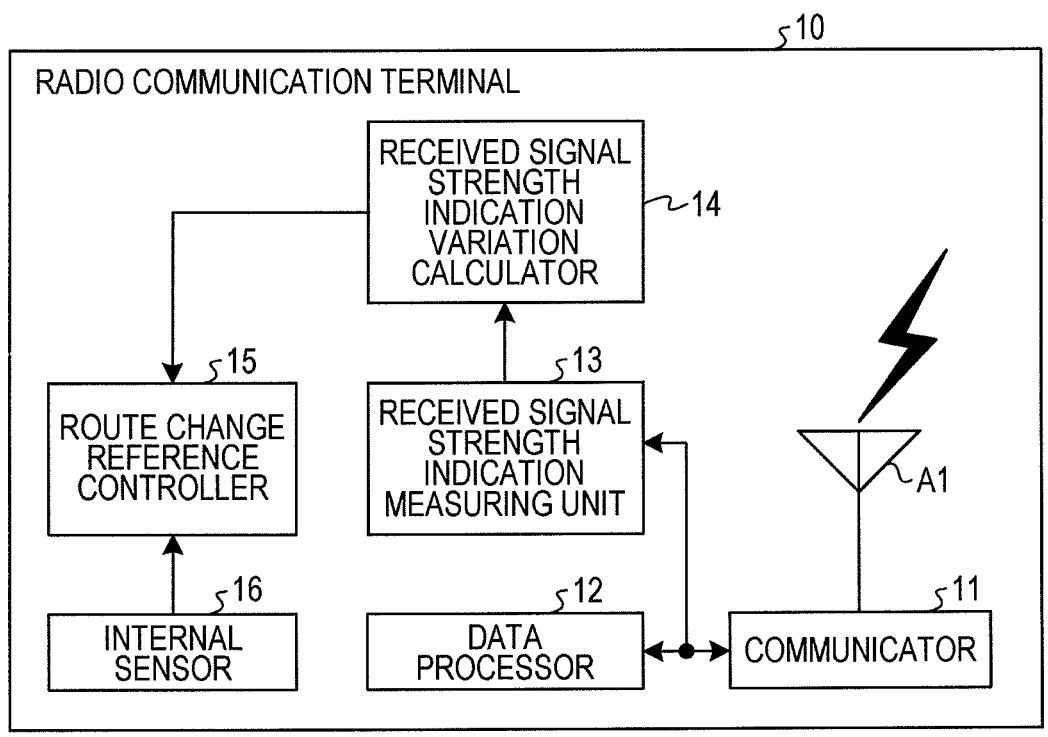
FIG. 2 illustrates the functional configuration of a radio communication terminal according to the embodiment.

FIG. 2 illustrates the functional configuration of the radio communication terminal 10 according to the embodiment. As depicted in FIG. 2, the radio communication terminal 10 includes a communicator 11, a data processor 12, a received signal strength indication measuring unit 13, a received signal strength indication variation calculator 14, a route change reference controller 15, and an internal sensor 16. The communicator 11 includes an antenna A1. These constituent elements are connected so that a signal and data can be inputted and outputted uni-directionally or bi-directionally.

The communicator 11 transmits/receives a packet to and from the radio communication terminals 20 and 30 via the radio channel. The communicator 11 notifies the other radio communication terminals 20 and 30 of a changed determination reference in response to the change of the determination references for whether or not to change a communication route of a packet. The data processor 12 processes a packet received by the communicator 11 in accordance with a predetermined application program and outputs the processing result to the communicator 11 in the form of packets.

The received signal strength indication measuring unit 13 measures a received signal strength indication in packet reception. That is, the received signal strength indication measuring unit 13 measures a received signal strength indication (RSSI) which is one of indexes indicating link quality, by using a packet inputted from the communicator 11. Further, the received signal strength indication measuring unit 13 outputs the measured received signal strength indication to the received signal strength indication variation calculator 14 which will be described later. The received signal strength indication variation calculator 14 monitors temporal change of the received signal strength indication inputted from the received signal strength indication measuring unit 13 so as to calculate a variation value (for example, 30 dB/s) of the received signal strength indication.

The route change reference controller 15 increases/decreases a route change reference on the basis of the above-mentioned variation value inputted from the received signal strength indication variation calculator 14. That is, the route change reference controller 15 performs control of changing a determination reference for whether or not to change a packet communication route, in accordance with temporal change of the received signal strength indication. At this time, the route change reference controller 15 observes only a link which can be observed from the radio communication terminal 10 or a moving speed of the radio communication terminal 10 so as to perform control of increasing/decreasing the determination reference of the route change. Specifically, when variation of a received signal strength indication exceeds an upper limit threshold value, the route change reference controller 15 changes (increases in a case of the received signal strength indication) the above-mentioned determination reference so that change of the packet communication route does not easily occur. On the other hand, when variation of a received signal strength indication is lower than a lower limit threshold value, the route change reference controller 15 changes (decreases in a case of the received signal strength indication) the above-mentioned determination reference so that change of the packet communication route easily occurs. The internal sensor 16 is an acceleration sensor or a global positioning system (GPS) sensor. The internal sensor 16 observes a moving speed, which is one of indexes indicating link quality, of the radio communication terminal 10 and outputs the observation result to the route change reference controller 15.

Figure 3:
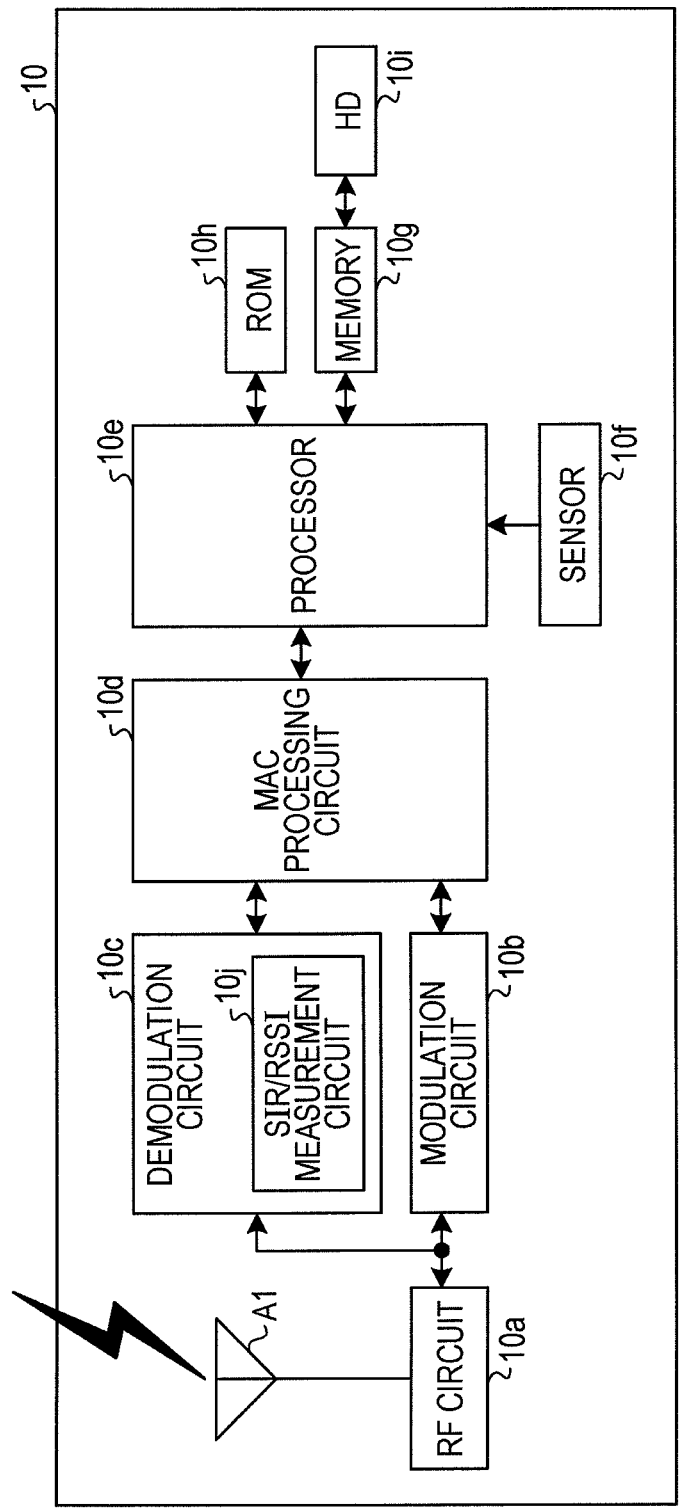
FIG. 3 illustrates the hardware configuration of the radio communication terminal according to the embodiment.

The hardware configuration of the radio communication terminal 10 is now described. FIG. 3 illustrates the hardware configuration of the radio communication terminal 10 according to the embodiment. As depicted in FIG. 3, in the radio communication terminal 10, a radio frequency (RF) circuit 10a, a modulation circuit 10b, a demodulation circuit 10c, a media access control (MAC) processing circuit 10d, a processor 10e, a sensor 10f, a memory 10g, a read only memory (ROM) 10h, and hard disk (HD) 10i are connected with each other so that various signals and data can be inputted/outputted. The RF circuit 10a includes the antenna A1. The demodulation circuit 10c includes a signal to interference ratio (SIR)/RSSI measurement circuit 10j.

The processor 10e is a central processing unit (CPU) or a digital signal processor (DSP), for example, and controls the radio communication terminal 10 overall. The memory 10g is a non-volatile storage device such as a flash memory or a RAM such as a synchronous dynamic random access memory (SDRAM), for example. The memory 10g stores not only various values of a received signal strength indication and a moving speed which are indexes of link quality but also an identifier of a terminal which is a relay point of packet routes before and after change, for example. In the ROM 10h, calculation algorithm of a variation value of a received signal strength indication and control algorithm of a route change reference are stored, for example. The HD 10i preliminarily stores the above-mentioned upper limit and lower limit threshold values, for example.

The communicator 11 depicted in FIG. 2 is realized by the RF circuit 10a, the modulation circuit 10b, and the demodulation circuit 10c that serve as hardware. The data processor 12 is realized by the processor 10e which serves as hardware. The received signal strength indication measuring unit 13 is realized by the SIR/RSSI measurement circuit 10j which is part of the demodulation circuit 10c which serves as hardware. Each of the received signal strength indication variation calculator 14 and the route change reference controller 15 is realized by the processor 10e, the memory 10g, and the ROM 10h that serve as hardware. The internal sensor 16 is realized by the sensor 10f which serves as hardware.

The configuration of the radio communication terminal 10 has been described thus far, and the configurations of the radio communication terminals 20 and 30 which are other radio communication terminals in the same ad-hoc network are same as the configuration of the radio communication terminal 10. Accordingly, common constituent elements are given reference characters of which the ends are common to each other as appropriate and illustration and detailed description thereof are omitted.

An operation is now described. As premises for description of the operation, the radio communication terminal 10 functions as a master unit which chiefly selects a route and the radio communication terminals 20 and 30 which are other radio communication terminals function as slave units a and b which receive and transfer a packet in accordance with the route which is selected by the radio communication terminal 10 serving as the master unit.

Figure 4:
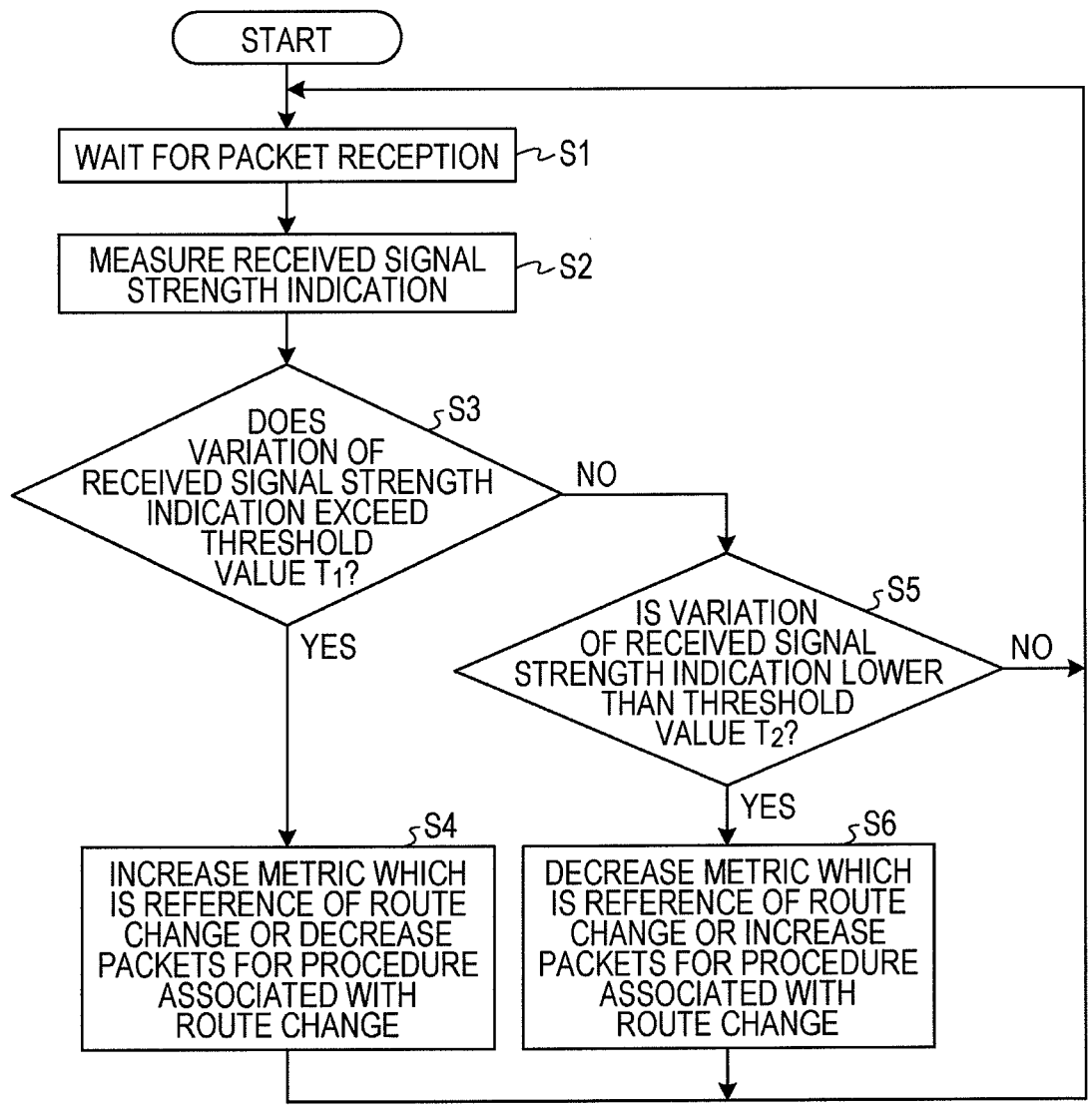
FIG. 4 is a flowchart illustrating metric increase/decrease control processing performed by the radio communication terminal in the embodiment.

FIG. 4 is a flowchart illustrating metric increase/decrease control processing performed by the radio communication terminal 10 in the embodiment. As depicted in FIG. 4, the RF circuit 10a of the radio communication terminal 10 waits for reception of a packet in S1. A packet which is an object of waiting of reception does not have to be a packet related to setting or change of routes but may be any packet such as a packet for time synchronization among terminals, a hello packet, or a packet for notifying of assignment change of network resources, for example.

When the processor 10e of the radio communication terminal 10 receives a packet from the radio communication terminals 20 and 30 which are other radio communication terminals in the same network, the processor 10e measures a received signal strength indication of each of the terminals by using the packet (S2). In S3, the processor 10e determines whether or not variation of the received signal strength indication of each of the radio communication terminals 20 and 30 exceeds an upper limit threshold value $T_1$ in communication of the last N times or during T seconds. It is preferable that such determination be performed with a regular range of times or a regular temporal range for highly-accurate determination of a degree of variation. The range of times is from approximately 3 times to 30 times, for example, and the temporal range is from approximately 3 seconds to 10 seconds, for example. Further, the upper limit threshold value $T_1$ of variation is approximately 25 to 35 dB per second, for example.

When variation exceeding the above-mentioned upper limit threshold value $T_1$ is recognized in the received signal strength indication in communication in the last N times or during T seconds as a result of the determination of S3 (Yes in S3), the processor 10e of the radio communication terminal 10 determines that link quality of the network sharply varies. Accordingly, the processor 10e increases a metric which is a reference for whether or not to perform route change (hereinafter, described as a "reference metric") (S4). For example, when it is assumed that the reference metric of link destination change is 5, the processor 10e increases the reference metric from 5 to 10 so as to be in a state not to perform the route change unless there is prospect that the prior metric increases up to 10 or more, in other words, unless a merit in cost becomes enormously high. Accordingly, references for route change become strict and the route change does not easily occur. After the end of the processing of S4, the processing returns to S1 and the processing from S1 is performed.

As described above, the processor 10e increases the metric which is the reference of the route change in this embodiment. Accordingly, even in a case where exceedingly low metric can be expected by the route change even with sharp variation of a received signal strength indication, that is, in a case where merit in the route change is exceedingly high, the route change is performed. However, when variation exceeding the upper limit threshold value $T_1$ is recognized in the received signal strength indication (Yes in S3), it may be set that the processor 10e does not permit any route change. Accordingly, transmission/reception of a packet for the route change procedure is suppressed. Consequently, reduction of throughput and increase of power consumption that are associated with transmission/reception of a packet will not occur.

Further, the processor 10e increases the metric which is the reference for whether or not to perform the route change in S4, and at the same time, or in substitution for this, the processor 10e may change the method of the route change. Here, the change of the route change method includes decreasing packets for the procedure associated with the route change. That is, when performing route change to a route of which a received signal strength indication is higher and the cost is lower, the processor 10e may maintain the connection without cutting the link of the change source route. Accordingly, even when the received signal strength indication of the route after the change is decreased and the cost is increased due to variation of the received signal strength indication after the route change, a packet can easily and promptly return to the route before the change.

When the variation of the received signal strength indication is equal to or less than the upper limit threshold value $T_1$ in the result of the determination in above-described S3 (No in S3), the processing goes to S5 and processing opposite to above-described S3 and S4 is performed. That is, in S5, the processor 10e determines whether or not variation of the received signal strength indication of each terminal is lower than a threshold value $T_2$ which is a lower limit threshold value in communication in the last N times or during T seconds. It is preferable that such determination be performed with a regular range of times or a regular temporal range so as to highly-accurately determine a degree of the variation. The range of times is from approximately 3 times to 30 times, for example, and the temporal range is from approximately 3 seconds to 10 seconds, for example. Further, the lower limit threshold value $T_2$ of variation satisfies upper limit threshold value $T_1 > T_2$ and is approximately 10 to 20 dB per second, for example.

When only variation lower than the above-mentioned lower limit threshold value $T_2$ is recognized in the received signal strength indication in the communication of the last N times or during T seconds in the result of the determination of S5 (Yes in S5), the processor 10e of the radio communication terminal 10 determines that the link quality of the network is stable. Accordingly, the processor 10e decreases the metric which is the reference for whether or not to perform the route change (S6). For example, when it is assumed that the reference metric of the route change is 5, the processor 10e decreases the reference metric from 5 to 2 so as to be in a state to immediately perform the route change in a case where there is prospect that the prior metric increases up to 2 or more, in other words, in a case where any merit is generated by the route change. Accordingly, the reference for the route change is mitigated and the route change easily occurs. After the end of the processing of S6, the processing returns to S1 and the radio communication terminal 10 waits for new packet reception.

The processor 10e of the radio communication terminal 10 increases the reference metric so that the route change does not easily occur and suppress fluctuation of the packet transmission route in S4. On the other hand, in S6, the radio communication terminal 10 performs desired route change with certainty. That is, when increase of the metric after the route change is highly likely estimated, the processor 10e determines that the route change has to be performed and decreases the reference metric so as to prompt the route change.

Further, the processor 10e decreases the metric which is the reference for whether or not to perform the route change in S6, and at the same time, or in substitution for this, the processor 10e may change the method of the route change. Here, the change of the route change method includes increasing packets for the procedure related to the route change. That is, when performing route change to a route of which a received signal strength indication is higher and the cost is lower, the processor 10e presumes that an optimum route is not likely to be changed again in a short period of time in light of the metric and does not assume the return to the route before the change. Accordingly, the processor 10e cuts the link and performs switching to a new route from the prior route without maintaining the connection of the change source route.

On the other hand, when variation lower than the lower limit threshold value $T_2$ is not recognized in the received signal strength indication in the result of the determination in above-described S5 (No in S5), the processor 10e determines that the reference value of the current metric is maintained at an appropriate value (between the lower limit threshold value $T_2$ and the upper limit threshold value $T_1$). Accordingly, the radio communication terminal 10 returns to S1 and waits for new packet reception without performing increase/decrease control of the reference metric.

(Modification 1)

Figure 5:
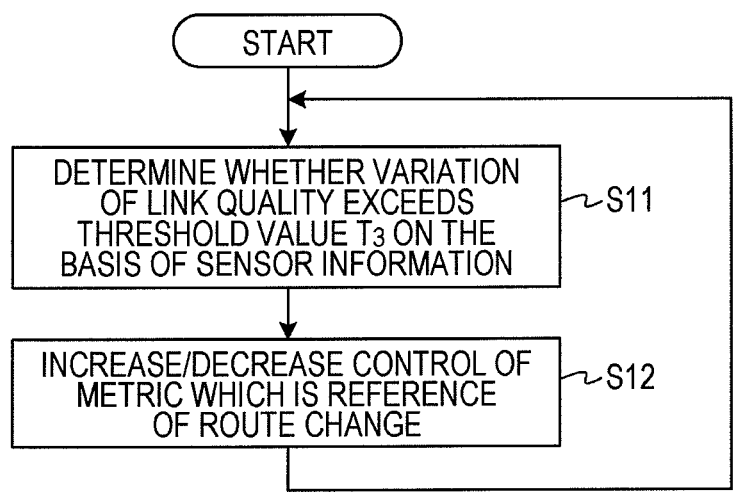
FIG. 5 is a flowchart illustrating metric increase/decrease control processing performed by a radio communication terminal in Modification 1.

Modification 1 as a modified form of the embodiment is described with reference to FIG. 5. FIG. 5 is a flowchart illustrating metric increase/decrease control processing performed by the radio communication terminal 10 in Modification 1. In the above-mentioned embodiment, a received signal strength indication (RSSI) is used as an index for estimating a degree of variation of link quality in an ad-hoc network. However, the radio communication terminal 10 may estimate a degree of variation of link quality on the basis of variation of a moving speed. In Modification 1, the radio communication terminal 10 employs the configuration and an operation that are approximately the same as those of the above-described embodiment, except for a use of a measurement result of a moving speed. Therefore, the description thereof (for example, above-mentioned S1 and S2) is omitted.

In S11 of FIG. 5, the processor 10e determines whether or not variation of the link quality exceeds an upper limit threshold value $T_3$ on the basis of a moving speed sensed by the sensor 10f. This processing of S11 corresponds to the above-described processing of S3. In S12, the processor 10e performs increase/decrease control of the metric which is the reference of the route change. This processing of S12 corresponds to the above-described processing of S4 to S6.

Here, the sensor 10f is a sensor which is capable of analogizing a moving speed of the radio communication terminal 10 which is a packet transmission source, at predetermined accuracy. For example, an acceleration sensor, a GPS sensor, or the like is applicable to the sensor 10f. Further, the sensor 10f does not have to be a sensor which is capable of directly calculating a moving speed, but may be a sensor which is capable of analogizing a moving speed in an indirect fashion. As the sensor which is capable of analogizing a moving speed in an indirect fashion, a heartbeat sensor or a blood pressure sensor, for example, is applicable. For example, in a case of the heartbeat sensor, the sensor 10f can analogize a current state of a trial subject (in a motional state or a halting state, for example) from the degree of a measured heart rate and can analogize variation of the moving speed of the trial subject from an increase/decrease value of the measured heart rate.

Here, when the processor 10e analogizes the degree of variation of link quality, the processor 10e may use a received signal strength indication in combination with a moving speed.

Figure 6:
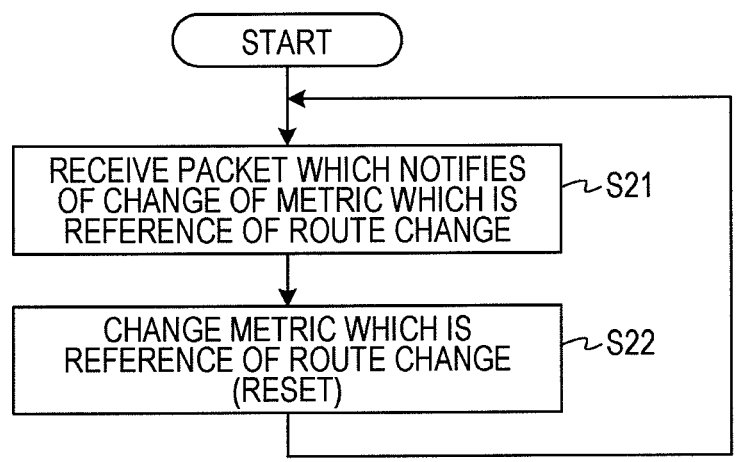
FIG. 6 is a flowchart illustrating metric increase/decrease control processing performed by other radio communication terminal in the embodiment and Modification 1.

Operations of the radio communication terminals 20 and 30 which are other radio communication terminals according to the above-described embodiment and Modification 1 are now described. FIG. 6 is a flow chart illustrating metric increase/decrease control processing performed by the other radio communication terminals 20 and 30 in the embodiment and Modification 1. In order that the master unit reflects change of a reference metric to a plurality of slave units a and b, this metric increase/decrease control processing is performed as posterior processing of the above-described metric increase/decrease control processing performed by the radio communication terminal 10. First, the radio communication terminal 10 notifies the radio communication terminals 20 and 30 which are other radio communication terminals in the same network of increase (S4) or decrease (S6) of the metric, after performing processing of the above-mentioned S4 or S6 (refer to FIG. 4). This notification is performed by transmission/reception of a packet (S21).

In S22, when the respective radio communication terminals 20 and 30 receive the packet, the radio communication terminals 20 and 30 set the reference metric to a value same as that of the radio communication terminal 10 in accordance with the above-mentioned notification. For example, when the reference metric is increased to 10 due to the state in which variation of the received signal strength indication exceeds the upper limit threshold value $T_1$, the reference metric is set to 10 in each of the radio communication terminals 20 and 30 as well. On the other hand, when the reference metric is decreased to 2, the reference metric is set to the value, that is, 2, in each of the radio communication terminals 20 and 30 as well. Accordingly, the reference metrics are matched in all the terminals constituting the ad-hoc network. However, regardless of whether the reference metric is increased or decreased, unless inversion of received signal strength indications or moving speeds between the radio communication terminals occur, for example, the route does not have to be changed. Accordingly, even when the reference metric is changed, the route change remains in a permitted state (possible state) and the route change might not be actually performed at this time.

Here, in light of, for example, a received signal strength indication, a moving speed, and the like that are indexes indicating the link quality, when a route exhibiting a metric lower than the current route (low-cost route) is detected, the route change is actually performed. That is, inversion of metrics leads the route change. Further, the performance of the route change can be started when a value of a metric of the current route does not satisfy a predetermined value. The predetermined value varies depending on a kind of the metric. When the radio communication system 1 uses a received signal strength indication as a metric, the predetermined value is approximately −105 to −95 dBm, for example.

Here, values of the reference metrics of the respective radio communication terminals 10, 20, and 30 do not have to be equivalent to each other, and values of the reference metrics may differ among terminals. However, it is expected that communication environments of installation positions of respective terminals (for example, variation of received signal strength indications) and operation states (for example, moving speeds) are approximately equivalent to each other respectively in a small network such as an ad-hoc network, in general. Therefore, in a case where it is predicted that same values of the reference metrics among the respective radio communication terminals 10, 20, and 30 do not cause problems in throughput or power consumption, it is preferable that the respective slave units a and b employ the same reference metric as that of the master unit in accordance with the instruction of the master unit as described above. This omits processing (the determination processing of above-mentioned S3 and S5) of individually performing comparison between variation of a received signal strength indication and a threshold value and comparison between a moving speed and a threshold value in the radio communication terminals 20 and 30 which serve as the slave units. Accordingly, the respective radio communication terminals 20 and 30 can omit the increase/decrease control processing based on the above-mentioned determination processing or the determination result, and therefore processing loads and processing time associated with the increase/decrease control processing can be reduced. As a result, the network can be effectively operated.

Further, in S22, the respective radio communication terminals 20 and 30 change the reference metrics (route change references), but the respective radio communication terminals 20 and 30 may change the route change method as is the case with the radio communication terminal 10. Here, the route change method includes the method of cutting a route of a change source or the method of maintaining the route, which is employed by the respective radio communication terminals 20 and 30, in the change of the route, as described above. The both of the route change reference and the route change method may be changed.

Figure 7:
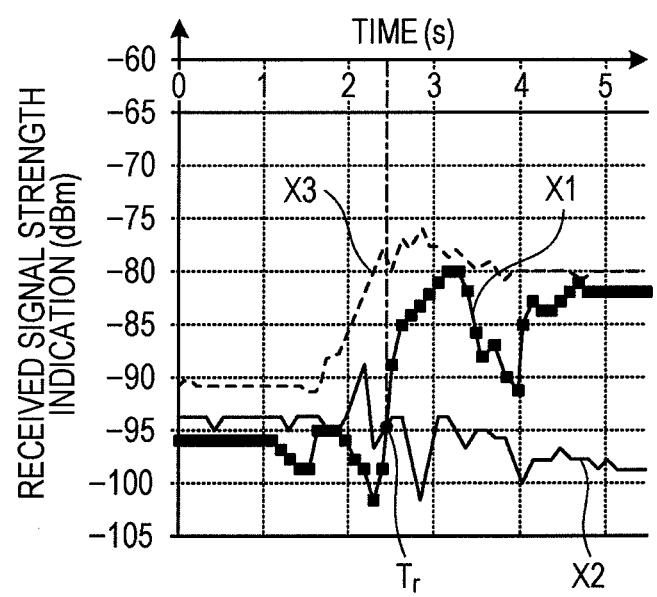
FIG. 7 illustrates temporal change of received signal strength indications among three terminals which are put on a human body in sleep.

An application example of the radio communication system 1 is described below by taking an example in which three radio communication terminals 10, 20, and 30 (master unit, slave units a and b) are placed on respective parts of a human body. For example, the radio communication terminals 10, 20, and 30 are respectively put on a head, breast, and an arm. FIG. 7 illustrates temporal change of received signal strength indications among the three terminals which are put on the human body during sleep. In FIG. 7, time (the unit is s) is defined on an x axis and an actual measurement value (dBm) of a received signal strength indication is defined on y axis.

As depicted in FIG. 7, all of a received signal strength indication X1 between the master unit and the slave unit a, a received signal strength indication X2 between the master unit and the slave unit b, and a received signal strength indication X3 between the slave units a and b stably shift in a range from −100 to −90 dBm until approximately 1.5 seconds elapses. However, the received signal strength indications X1 to X3 start to vary from time elapse of approximately 1.5 seconds, the level of the variation is peaked at approximately 3.2 seconds, and then the received signal strength indications X1 to X3 are restabilized from approximately 4.8 seconds. That is, absolute values and variation directions of the received signal strength indications X1 to X3 are different from each other, but forms and degrees of variation are similar to each other. In other words, the received signal strength indications of the radio communication terminals 10, 20, and 30 shift in conjunction with each other. Accordingly, it is understood that if variation (variation of a received signal strength indication and a moving speed of a terminal) of link quality of only one terminal (for example, the master unit) is observed, it can be predicted that link quality of other two terminals (the slave units a and b) exhibits variation approximately similar to that of the one terminal in the radio communication system 1. Therefore, if only the radio communication terminal 10 which is the packet transmission source performs control of increasing/decreasing the reference metric on the basis of variation of the link quality of the radio communication terminal 10 and notifies other terminals of the result, appropriate route change can be realized even if the other terminals do not perform similar control. As a result, effective route change is enabled.

Further, in FIG. 7, the received signal strength indication X3 is approximately −91 dBm which is the highest value, the received signal strength indication X2 is approximately −94 dBm which is the second highest value, and the received signal strength indication X1 is approximately −96 dBm which is the lowest value, from 0 to approximately 1.5 seconds. Accordingly, it is desirable that the master unit does not transmit a packet to the slave unit b via the slave unit a but the master unit transmits the packet directly to the slave unit b in an initial state from viewpoints of throughput enhancement and power consumption reduction. Here, it is assumed that the received signal strength indication X1 overtakes the received signal strength indication X2 at time $T_r$, which is depicted on a dashed-dotted line, due to rolling over of a trial subject during sleep, for example. In this case, it is predicted that it is desirable not to take a prior route in which a packet directly reaches the slave unit b from the master unit but to take a route in which the packet reaches the slave unit b via the slave unit a from the master unit as a packet communication route from a viewpoint of stable packet communication. Accordingly, the packet communication route is changed from the route P1 (refer to FIG. 1) dependent on a value of the received signal strength indication X2 to the route P2 independent from the value of the received signal strength indication X2.

Further, as depicted in FIG. 7, in a case of a state in which the received signal strength indications of the respective radio communication terminals 10, 20, and 30 exhibit small variation (stable state), such situation that the received signal strength indications reverse again afterward and new route change has to be performed is hardly generated even though the radio communication terminal 10 performs the route change. That is, in a case of small variation of the received signal strength indications as depicted in FIG. 7, it is meaningful for the radio communication terminal 10 to perform the route change. Actually, in FIG. 7, after inversion between the received signal strength indications X2 and X1 occurs, the received signal strength indications of the respective terminals stably shift again. Further, in received signal strength indications of respective terminals, the received signal strength indications X3 and X1 have high values as approximately −82 dBm and the received signal strength indication X2 exhibits a relatively lower value (−98 dBm) than the other two received signal strength indications X3 and X1, so that it is understood that it is appropriate to relay a packet through the slave unit a.

As described above, when variation of a received signal strength indication is small, the radio communication terminal 10 changes the route in response to inversion of the received signal strength indications between the terminals so that the new route has the higher received signal strength indication. Therefore, the radio communication terminal 10 decreases the reference metric so that the route change easily occurs (S6 of FIG. 4). Accordingly, the radio communication system 1 can select an optimum route to perform the route change while suppressing fluctuation of the route change.

Here, when inversion occurs again after an occurrence of inversion between the received signal strength indications X2 and X1, the packet communication route returns from the prior route P2 (refer to FIG. 1) to the initial route P1 in which the packet does not travel via the slave unit a.

Figure 8:
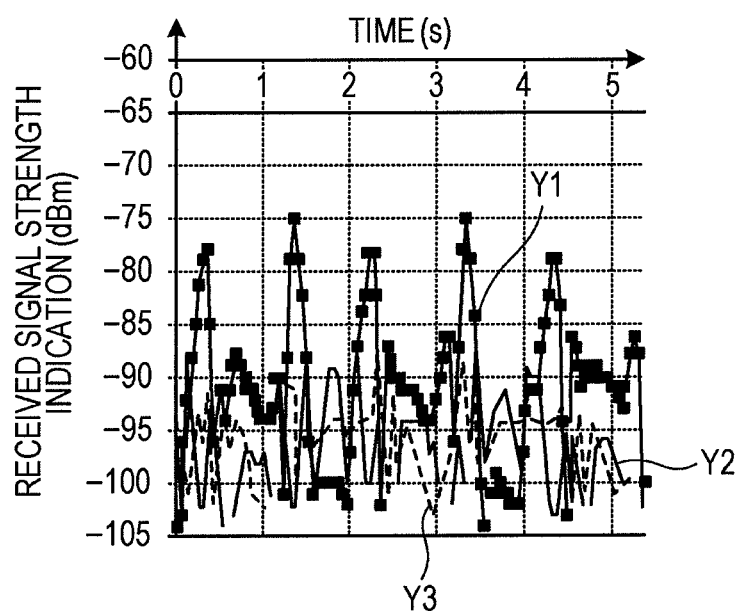
FIG. 8 illustrates temporal change of received signal strength indications among three terminals which are put on a human body in walking.

On the other hand, FIG. 8 illustrates temporal change of received signal strength indications among three terminals which are put on a human body during walking. In FIG. 8, time (the unit is s) is defined on an x axis and an actual measurement value (dBm) of a received signal strength indication is defined on a y axis, as is the case with FIG. 7. In FIG. 8, a solid line Y1 to which plot points are provided indicates shift of a received signal strength indication through time between the master unit and the slave unit a in walking. In a similar manner, a solid line Y2 to which no plot points are provided indicates shift of a received signal strength indication between the master unit and the slave unit b in walking. Further, a dashed line Y3 indicates shift of a received signal strength indication between the slave unit a and the slave unit b in walking.

As depicted in FIG. 8, in walking of the trial subject, radio propagation environments of respective terminals largely vary in conjunction with movement of the trial subject, so that inversion of received signal strength indications of respective terminals frequently occurs continuously. When the route change is performed under references and a method that are similar to those during sleep under such situation, the communication volume of packets for a procedure of the route change is increased enormously, which may cause significant reduction of throughput and increase of power consumption of the radio communication system 1. Therefore, it is preferable that the radio communication terminal 10 increase the reference metric (S4 of FIG. 4) so that the route change does not easily occur, when fluctuation of received signal strength indications of the respective terminals exceeds a threshold value, in other words, when fluctuation of received signal strength indications is large. Accordingly, unwanted route change and resulting degradation of the system performance can be avoided.

In the actual measurement result as well, when the radio communication terminal 10 performed the route change in a sleeping state, throughput was increased from 92% to 97%. On the other hand, when the route change was performed in a walking state, throughput was adversely decreased from 94% to 90%. From these results as well, it is confirmed that limitation of performance of the route change to a case of small variation of link quality is effective for improvement of throughput.

As the application example of the radio communication system 1, a case where all radio communication terminals are put on the same human body is illustrated. When the way of variation of one link quality and the way of variation of another link quality have close correlation as the above-mentioned application example, the radio communication system 1 can analogize variation of link quality of another route from variation of one link quality. As a result, accurate route selection is enabled. Accordingly, the radio communication system 1 is preferably applied to a small network such as an ad-hoc network of approximately 2 hops, for example. Alternatively, such network is preferably employed that all terminals in the network are placed in similar environments and the terminals operate in conjunction with each other. Examples of such network include BAN using medical equipment or a watch and a communication network between vehicles (vehicle-to-vehicle communication) using intelligent transport systems (ITS).

As described above, in the radio communication system 1, the radio communication terminal 10 performs data communication with another radio communication terminal 30. The radio communication terminal 10 includes the received signal strength indication measuring unit 13, the received signal strength indication variation calculator 14, and the route change reference controller 15. The received signal strength indication measuring unit 13 acquires property information (a received signal strength indication and a moving speed that are indexes indicating link quality) which indicates a property and is used in determination of a data communication route on which data communication is performed with the other radio communication terminal 30. The received signal strength indication variation calculator 14 calculates variation of the above-mentioned property by using the acquired property information. The route change reference controller 15 changes a determination reference for whether or not to change the data communication route, in response to the calculated variation of the above-mentioned property. Further, the other radio communication terminal 30 includes a communicator 31. The communicator 31 receives data which is transmitted from the radio communication terminal 10 via the above-mentioned data communication route. Further, when the variation of the property exceeds a first predetermined value (upper limit threshold value $T_1$), the route change reference controller 15 changes the determination reference so that change of the data communication route does not easily occur. On the other hand, when the variation of the property is lower than a second predetermined value (lower limit threshold value $T_2$) which is smaller than the first predetermined value, the route change reference controller 15 changes the determination reference so that change of the data communication route easily occurs.

That is, the radio communication terminal 10 can increase throughput by changing a route of a packet transmission from the radio communication terminal 10 to a transmission destination terminal into a route of which metric is lower, in other words, into a route of lower cost. However, even if transmission time of a data packet is shortened by route change, a processing procedure for the route change itself, namely, a load or time related to another packet communication for completing the route change may cause degradation of throughput of the whole of the system. Therefore, it is effective for the radio communication terminal 10 to avoid the route change when it is predicted that an amount of lowering of throughput caused by the route change exceeds an amount of increase of throughput which is an advantageous effect of the route change. The radio communication system 1 according to the embodiment limits opportunities for execution of the route change to a case where effectiveness of the route change is reliably expected. Accordingly, route change which has been fundamentally unwanted is suppressed and packet transmission opportunities for route change are reduced. Therefore, increase of communication loads or communication time caused by fluctuation of routes is suppressed. As a result, the radio communication system 1 can improve throughput as a whole. Here, power consumption can be reduced due to the same reasons.

In related art, when the radio communication terminal 10 detects slight variation of link quality, the radio communication terminal 10 performs route change immediately in response to the variation. Therefore, packets for performing a route change procedure (for example, packets for notifying all terminals of packet lives) have been transmitted to all radio communication terminals which are disposed in a network in each case. Accordingly, simultaneous delivery of large amounts of packets is frequently performed in the network, increasing the packet communication volume. This has caused degradation of throughput and increase of power consumption of the radio communication system.

Therefore, when decrease of metric which can be expected from route change (cost reduction) is small, the radio communication system 1 according to the embodiment purposely does not perform the route change in light of increase of the communication volume and power consumption associated with the route change. In other words, the cost of the whole system (total cost) is given priority over cost reduction by route change. Then, when the link quality is stabilized (for example, in sleeping of a trial subject) and further, a route of low cost (low metric) is changed (for example, roll-over of the trial subject), a packet transmission route is changed. Accordingly, the packet transmission for route change is limited to a case where an advantage associated with route change is secured. Consequently, route change processing is made more efficient.

Further, the radio communication terminal 10 autonomously analogizes a reduced value of a metric associated with route change and autonomously changes a determination reference of the route change without regularly exchanging packets containing link information with the other radio communication terminals 20 and 30. Accordingly, the radio communication terminal 10 can simply and quickly determine necessity of route change.

More specifically, when link quality exhibits large variation, it has been concerned that a network becomes congested due to overhead of packets associated with route change. In order to reduce such concern, in the radio communication system 1, when the radio communication terminal 10 detects large variation of link quality, the radio communication terminal 10 tries to avoid the congestion of the network by the following two methods.

The first method is performing no route change and this is an aspect of the change of the "route change reference" defined in S4 and S6 of FIG. 4. The second method is performing route change and reducing overhead of packets associated with the route change, and this is an aspect of the "route change method" described above. The detailed description of the operation of the first method has been provided, so that the description thereof is omitted. The second method further includes a method for increasing packets for the route change procedure and a method for decreasing packets for the route change procedure.

In the method for increasing packets for the route change procedure, the radio communication terminal 10 transmits a communication cutting requisition packet to a terminal on a route which is before change and transmits a communication establishment requisition packet to a terminal on a new route. In response to this, the volume of data which is relayed by the radio communication terminal 30 which is a destination terminal varies as well, so that the radio communication terminal 30 may transmit the communication cutting requisition packet and the communication establishment requisition packet as well. Accordingly, an unwanted band is deleted and a desired band is secured. On the other hand, as the route change method for decreasing packets for the route change procedure, such method has been provided that a route is changed without transmitting/receiving packets, which cause overhead, for a route change procedure under the premise that the radio communication terminal 10 has already established a new route as well. In such method, unwanted bands as well as bands which are actually used as routes continually exist. Accordingly, such purpose that the radio communication system 1 decreases packets for a procedure related to route change and suppresses overhead is realized though this method is ineffective from a viewpoint of effective use of a bandwidth.

In change of route change methods as well, an increase/decrease control method similar to the above-described change of a route change reference can be employed. That is, in the change of a route change reference, the processor 10e executes control processing for increasing or decreasing a value of a metric (reference metric) which is a reference of the route change. In a similar manner, in the change of a route change method, the processor 10e executes control processing for decreasing or increasing the volume of packets for a procedure related to the route change. That is, in the change of a "route change method", when variation of link quality exceeds an upper limit threshold value (corresponding to Yes in S3 of FIG. 4), the processor 10e decreases packets for a procedure related to the route change. On the other hand, when variation of the link quality is lower than a lower limit threshold value (corresponding to Yes in S5 of FIG. 4), the processor 10e increases packets for the procedure related to the route change. The radio communication terminal 10 repeatedly executes the series of the above-mentioned processing at predetermined periods (for example, approximately one second to one minute).

Further, the radio communication terminal 10 further includes the communicator 11 which notifies the radio communication terminals 20 and 30 which are other radio communication terminals in the same network, of a changed determination reference (reference metric) in response to the change of the determination reference. Accordingly, route change reference control which is the same as that of the radio communication terminal 10 does not have to be performed in all the terminals constituting the radio communication system 1. Therefore, the other radio communication terminals 20 and 30 can obtain the same advantageous effect as that in a case where the similar route change reference control is performed, only by changing (resetting) a route change reference as appropriate in accordance with notification from the radio communication terminal 10 even without performing increase/decrease control of the determination reference by itself. As a result, processing loads and processing time in the radio communication terminals 20 and 30 are reduced, improving processing efficiency of the radio communication system 1.

However, in the present embodiment, on the assumption of a small network or a network in which operations of respective terminals are similar to each other, the slave units a and b use a changed reference metric which is received from the master unit. However, when a large network in which respective terminals independently operate is employed, an aspect different from the above-described embodiment can be employed. That is, such aspect that each of all the terminals disposed in a network independently executes the same route change reference control processing as that of the terminal which is a data transmission source (corresponding to a master unit) can be employed. Further, such aspect can be of course employed that only one or some of the terminals disposed in a network independently execute the same route change reference control processing as that of the terminal which is the data transmission source, while the other terminals set reference metrics again in accordance with an instruction from the terminal which is the data transmission source.

In the above-described embodiment, the radio communication system 1 uses a received signal strength indication (RSSI) and a moving speed that are indexes indicating link quality as properties (metrics), which are used for determination of whether to change a route change reference or not, of respective radio communication terminals 10, 20, and 30. However, parameters used as the property are not limited to these. The property may be parameters indicating a link state such as a packet error rate (PER), a bit error rate (BER), a frame error rate (FER), and a signal-to-interference and noise power ratio (SINR), for example, as well as a received signal strength indication and a moving speed. Further, the property may be parameters such as a free space of a buffer memory of each terminal, residual power (remaining buttery amount), the number of hops, a link life (valid time of a link) based on mobility of a terminal (a moving speed or a location), a bandwidth, and the number of routes (flexibility of route selection).

In the above-described embodiment, the radio communication terminal 10 sets a link which is a monitoring object for quality variation to a link which can be observed from the radio communication terminal 10. However, the link which is a monitoring object of quality variation does not have to be the link which can be observed from the radio communication terminal 10 but a link which can be observed from only radio communication terminals other than the radio communication terminal 10. Accordingly, the radio communication terminal 10 can monitor link quality in a wider range. Therefore, the radio communication terminal 10 can more accurately determine a determination reference of whether to perform route change or not (reference metric) also in a relatively large network which includes a terminal of which a link is not directly observed from the radio communication terminal 10. As a result, general versatility, further, communication environment adjustability of the radio communication system 1 is improved.

Further, the ad-hoc network is illustrated as an aspect of a network of the radio communication system 1 according to the above-described embodiment. However, the network is not limited to this, and embodiments of the present disclosure are applicable to any network such as a network in which communication is performed via an access point (infrastructure mode) and a composite type of these networks. Kinds of links which are objects of quality measurement are not limited to a tree type link, but embodiments of the present disclosure are applicable to any link such as a mesh type link and a star type link. Further, the number of radio communication terminals which relay a packet in a network is not limited to one but may be two or more. Further, a transmission distance from the radio communication terminal 10 on a packet transmission side to a terminal device on a packet reception side and a distance (inter-device distance) between relaying terminal devices may have any values.

In the above-described embodiment, respective constituent elements of the radio communication terminal 10 do not have to be physically configured as illustrated in the drawings. That is, specific forms of dispersion and integration of respective devices are not limited to those in the drawings and all or part thereof can be configured to be functionally or physically dispersed and integrated in any units in accordance with various loads and using situations. For example, the received signal strength indication measuring unit 13 and the received signal strength indication variation calculator 14, or the route change reference controller 15 and the internal sensor 16 are respectively integrated as single constituent elements. In contrast, the route change reference controller 15 may diverges into a part which increases a reference metric of route change when variation of a metric exceeds an upper limit threshold value and a part which decreases the reference metric when variation of the metric is lower than a lower limit threshold value. Further, a memory in which a received signal strength indication, a threshold value of the received signal strength indication, and a setting route are stored may be connected via a network or a cable as an external device of the radio communication terminal 10.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A radio communication terminal, comprising:
a memory configured to store an algorithm; and
a processor, coupled to the memory, configured to perform, based on the algorithm, operations of:
communicating with other radio communication terminals;
acquiring property information indicating a property that is used when a data communication route, on which data communication is performed with the other radio communication terminals, is determined;
calculating variation of the property by using the acquired property information;
changing a determination reference so that the determination reference decreases when the variation of the property exceeds a first value, a change of the data communication route not easily occurring when the determination reference decreases; and
changing the determination reference so that the determination reference increases when the variation of the property is lower than a second value that is lower than the first value, the change of the data communication route easily occurring when the determination reference increases,
wherein a determination, by the processor, of whether the variation of the property exceeds the first value is performed with a regular range of times or a temporal range.

2. The radio communication terminal according to claim 1, wherein the processor notifies the other radio communication terminals of the changed determination reference in response to change of the determination reference.

3. A radio communication system, comprising:
a first radio communication terminal which performs data communication with a second radio communication terminal,
wherein the first radio communication terminal includes a processor which performs operations of:
acquiring property information indicating a property that is used when a data communication route, on which data communication is performed with the second radio communication terminal, is determined,
calculating variation of the property by using the acquired property information,
changing a determination reference so that the determination reference decreases when the variation of the property exceeds a first value, a change of the data communication route not easily occurring when the determination reference decreases; and
changing the determination reference so that the determination reference increases when the variation of the property is lower than a second value that is lower than the first value, the change of the data communication route easily occurring when the determination reference increases,
wherein the second radio communication terminal includes
a receptor configured to receive data that is transmitted via the data communication route from the first radio communication terminal,
wherein a determination, by the processor, of whether the variation of the property exceeds the first value is performed with a regular range of times or a temporal range.

4. The radio communication system according to claim 3, wherein:
the first radio communication terminal further includes a notify unit configured to notify the second radio communication terminal of the changed determination reference in response to change of the determination reference.

5. A radio communication method, comprising:

acquiring, by a radio communication terminal, property information indicating a property that is used when a data communication route, on which data communication is performed with other radio communication terminals, is determined;

calculating, by the radio communication terminal, variation of the property by using the acquired property information;

changing a determination reference so that the determination reference decreases when the variation of the property exceeds a first value, a change of the data communication route not easily occurring when the determination reference decreases;

changing the determination reference so that the determination reference increases when the variation of the property is lower than a second value that is lower than the first value, the change of the data communication route easily occurring when the determination reference increases, and communicating with the other radio communication terminals;

wherein a determination of whether the variation of the property exceeds the first value is performed with a regular range of times or a temporal range.

6. The radio communication method according to claim 5, wherein the other radio communication terminals are notified of the changed determination reference in response to the change of the determination reference.

* * * * *